United States Patent [19]

Cross et al.

[11] Patent Number: 4,561,385
[45] Date of Patent: Dec. 31, 1985

[54] FLUIDIZED BED SHELL BOILERS

[75] Inventors: Henry F. Cross, Rickmansworth; Maurice Harman, Bletchley, both of England

[73] Assignee: The Energy Equipment Company, Ltd., Bedfordshire, England

[21] Appl. No.: 563,313

[22] Filed: Dec. 20, 1983

[30] Foreign Application Priority Data

| Dec. 21, 1982 [GB] | United Kingdom | 8236259 |
| Feb. 17, 1983 [GB] | United Kingdom | 8304426 |
| Feb. 17, 1983 [GB] | United Kingdom | 8304427 |
| Aug. 2, 1983 [GB] | United Kingdom | 8320818 |

[51] Int. Cl.$^4$ .............................................. F22B 1/00
[52] U.S. Cl. ................................. 122/4 D; 110/234; 110/245; 110/263
[58] Field of Search ............... 110/245, 263, 234; 122/4 D; 431/7, 170

[56] References Cited

U.S. PATENT DOCUMENTS

| 3,736,908 | 6/1973 | Ehrlich et al. | 122/4 D |
| 3,983,927 | 10/1976 | Steever et al. | 122/4 D |
| 4,173,950 | 11/1979 | Waryasz | 110/263 |
| 4,183,330 | 1/1980 | Bryers et al. | 110/245 |
| 4,270,468 | 6/1981 | Robinson et al. | 122/4 D |
| 4,295,817 | 10/1981 | Caplin et al. | 431/7 |
| 4,314,967 | 2/1982 | Kwon et al. | 110/245 |
| 4,338,887 | 7/1982 | Leon | 110/347 |
| 4,349,969 | 9/1982 | Stewart et al. | 110/245 |
| 4,455,968 | 6/1984 | Northcote | 122/4 D |
| 4,455,969 | 6/1984 | Barker | 122/4 D |

Primary Examiner—Edward G. Favors
Assistant Examiner—Steven E. Warner

[57] ABSTRACT

Description is of fluidized bed shell boiler arrangements in which the sides of the bed within the furnace tube are generally vertical, being provided by vertical walls within the furnace tube. The bed walls may include water tubes or be substantially vertical portions of arcuate panels mounted within the furnace tube. Fluidizing gas is fed to fluidizing gas ducts communicating with the bed from a plenum chamber including paddles movable into positions closing off at least some of the ducts during initial start up of the boiler to reduce the amount of combustible gas (or hot gases) fed to the ducts when heating the bed to its operating temperature. The ducts may be formed by mounting halfround or U-shaped member on the bottom of the furnace tube, the ducts tapering along their lengths such that the gas passing into the bed exits at substantially the same velocity across the width and length of the bed. Control of the bed level is effected by determining if material is passing out of an aperture set in the bed wall at the height at which the bed is to be maintained and then adding or subtracting bed material as required.

16 Claims, 6 Drawing Figures

FLUIDIZED BED SHELL BOILERS

DESCRIPTION

The invention concerns fluidized bed combustors and is particularly, but not exclusively, concerned with fluidized bed shell boilers.

It is known to use fluidized beds of inert particulate material to support combustion of fuels e.g. in hot gas generators, gas generators and boilers. In such arrangements the bed of inert particulate material is fed with gases (air or a mixture of air and inert gas, e.g. recycled flue gas) which both act to fluidize the bed material and support of combustion of fuels fed thereto.

For the efficient operation of such combustors there are a number of design features which require particular consideration. Four of these are:-firstly, that the rate of heat transfer from the burning material is maximized: secondly that the bed material be properly and evenly fluidized; thirdly, that the level of the bed within the apparatus be maintained at an optimum level; and fourthly that the use of costly, high grade, fuels when pre-heating the bed (to bring it to an operating temperature) is minimized.

The efficient operation of a boiler, when raising steam or generating hot water, requires the effective transfer of heat generated by burning fuel to the water being heated.

In a fluidized bed shell boiler (in which the fluidized bed is conventionally located in the bottom of the boiler furnace tube) the heat generated by burning fuel is transferred to the water being heated by the boiler by conduction (directly from the hot bed material), by radiation (from the volume of the boiler above the bed in which combustion of gases evolving from the bed continues) and by convection (via the walls of smoke tubes through which the hot products of combustion leave the furnace tube on their way to a chimney or flue).

It is noted that to enhance the rate of conductive heat transfer from the bed the wall area between the bed and the water jacket should be maximized and it is, therefore, desirable that the bed be as far as possible completely enveloped by water retaining walls. In addition the bed walls should be well swept by the bed material to ensure maximum rate of heat transfer from the bed not only to heat the water but also to provide for of bed cooling (combustion of fuel within the bed may locally raise the bed temperature above acceptable limits unless heat is transferred away through the wall to the water jacket).

Furnace tubes in shell boilers are normally circular in cross-section to better resist the internal boiler pressures and as a result the fluidizing gases injected into a fluidized bed in such a tube need to be distributed by an arrangement following the contour of the bottom wall of the furnace tube (that is to say working at different depths and therefore different static pressures within the bed), or be provided at one or more horizontal planes within the bed (for example by sparge-pipes, bubble-cap decks or stand-pipes). The sloping sides of the furnace tube can lead to areas, at the sides of the bed, where poor fluidization, can occur with a resultant decrease in the level of heat transfer from the optimum level.

Accordingly an aspect of the invention provides a fluidized bed shell boiler including a fluidized bed within a furnace tube therein in which walls are provided within the furnace tube to bound the fluidized bed, at least those portions of said walls contacting the bed being disposed substantially vertically.

The walls may include hollow tubes communicating with the water jacket and through which water to be heated in the boiler flows.

The tubes may be closely spaced to form the wall through which the bed material cannot pass, or preferably spaced apart with conductive webs extending between those parts of the tubes bounding the bed to prevent the passage of bed material therebetween.

The webs may be modified to allow for their thermal expansion, without distortion, whilst the boiler is heating up.

The volume behind the webs, within the furnace tube of the boiler, may be filled with a refractory material of good thermal conductivity—preferably material cast in position—and provided with means for holding that material in position. An embodiment of the invention provides that the tubes are curved, extending substantially vertically within the furnace tube of the shell boiler to height above that of the fluidized bed and then curving outwardly to meet side wall portions of the furnace tube.

In an alternative arrangement the tubes are substantially straight and extend substantially vertically within the furnace tube.

The lower and upper ends of each tube form inlets and outlets respectively for water passing through the wall of the furnace tube and into the tube. The water within the tubes cools the tube surfaces and is heated by the combustion of fuel taking place within the furnace tube.

The provision of the volume of thermally conductive refractory material behind the vertical wall assists the transport of heat away from the burning fuel to the water jacket and prevents the accumulation of bed material behind the walls.

The provision of water tubes in part bounding the bed within the furnace tube provides additional heat transfer area. The tubes also provide a syphoning effect for water circulation within the boiler, particularly during the heating up process, when they act to prevent uneven temperature distribution within the boiler.

An alternative arrangement which this aspect of the invention encompasses provides that the vertical side walls for the bed are provided by vertical walls and/or substantially vertical sections of convex shape provided within the furnace tube. The side walls of the bed may be formed by two segments of lens-shaped partitions one to either side of the bed.

The bed bounding walls are preferably provided as arcuate panels located within the section of a generally circular furnace tube. The pockets formed behind the panels may be filled with water to be heated; water being fed to these pockets via holes in the furnace tube wall behind the panels. Such an arrangement allows for the convective flow water which enters the pockets behind the arcuate panels, takes up heat from the fluidized bed through the bed wall, and then leaves the pockets.

To distribute the forces acting on the arcuate panels against the furnace the tube wall we provide that the panels be strength-welded at both their upper and lower edges to the furnace tube wall and also stayed by barstays or plates as required to prevent excess stresses in the bed walls and the furnace tube.

Boilers embodying this aspect of the invention have the advantages of providing an evenly loaded cylinder wall for the furnace tube (which is subjected to the external pressure of the boiler water in a conventional manner) and providing vertical bounding of the bed within the furnace tube through which additional heat transfer can take place.

To further assist the transfer of heat away from the burning fuel we preferably provide that the end walls of the fluidized bed are formed as water containing walls. In this way the fluidized bed is completely surrounded by a water jacket offering the advantages: firstly; of maximising the heat transfer area across which useful heat may pass, and secondly; of preventing spillage of bed material into a part of the furnace tube conventionally not containing the fluidized bed.

The complete combustion of fuel fed to the bed requires that the fuel be rapidly and evenly distributed throughout the bed by the movement of bed material and that movement is a result of the uniform fluidization of that material.

At present known ways of feeding fluidizing gases to such beds include the use of sparge pipes or tubes which extend horizontally into and through the bed material, and the use of various bubble-cap type gas injector systems.

If sparge pipes are used they are sited in a severely erosive, corrosive and hot environment and this has led to such tubes being made of expensive alloy materials capable of withstanding the conditions they must meet. The high temperatures which sparge tubes encounter within a fluidized bed can cause the tubes to distort and the tubes need to be anchored in position by plates or links to restrain their movement. If a bubblecap type design is used a multitude of apertures are required to pass through the bottom wall of the bed container and severe operational difficulties arise from the propensity of the bed material to flow back or fall, through those apertures. Thus when using bubble-cap type designs expensive it increases in providing means ensuring the gas ports are protected to prevent the back flow of bed material through them.

Again, the velocity of fluidizing gases fed to the bed must be substantially constant across the whole area of the bed to provide for substantially uniform fluidization of the bed material. Difficulty has been found when using the known arrangements in ensuring that the velocity of the gases passing into the bed material is the same at different locations across the bed.

To alleviate these disadvantages there is preferably provided within a fluidized bed shell boiler embodying the invention a gas distributor arrangement for passing fluidizing gases to a fluidized bed, which distributor arrangement is formed integrally with the container of the bed and comprises the formation of one or more horizontal ducts extending between a bottom plate of the bed container and a hollow channel sections mounted thereon, the or each hollow channel section being formed with a number of gas exit ports.

In such an arrangement the or each duct may be supplied with fluidizing gas from one or both ends, or via pipes penetrating the plate on which it or they are mounted.

It is envisaged that the plate on which the or each channel section is mounted will be the furnace place of a shell boiler, and that the hollow channel section is formed of relatively inexpensive heavy material of large cross-section.

Again it is preferred that the gas distributor system within a shell boiler embodying the invention comprise one or more gas ducts provided with apertures through which gas therein may pass into the fluidized bed, the internal cross-section of the or each gas duct reducing along the length thereof in a direction extending away from that end of the or each duct to which the fluidizing gases are fed.

As a preferred arrangement the ducts are formed as half-round or U-shaped metal members welded to the bottom plates of the bed container.

We further provide when such half-round or U-shaped metal members are mounted on a non-flat bottom wall of a furnace (e.g. within a shell boiler) that the internal cross-section, and the size of the apertures, of the or each duct vary in dependence upon the depth of the duct from the top surface of the fluidized bed.

When operating a fluidized bed combustor it is desirable that the level of the bed be maintained substantially at the design level. Fluidized bed combustors are designed to operate with a particular depth of bed and any substantial variation from that bed depth means that operation of the combustor moves away from the optimum operational conditions.

In practice the level of the bed within a fluidized bed combustor can vary considerably whilst the combustor is operating. The aggregation of material within a fluidized bed (e.g. as fuel is added) causes the bed level to rise whilst the loss of material (as the fuel is burnt or as particles are carried away with the gases elutriating from the bed) causes the bed level to fall.

Suggestions have been made to control the level of the bed within a fluidized bed combustor by matching the rate at which material is fed to the bed (solid fuel and/or bed material) to the rate at which material is lost from the bed.

The proposals so far made have all included the use of one or more probes within the combustion chamber. The environment in which these probes would be placed is severe as within the combustion chamber they would be subjected to high thermal loading and the extremely corrosive action of the bed material.

A further feature of the invention provides a method of operating a fluidized bed combustor which includes the steps of monitoring the outflow of material from the combustion chamber via an aperture formed in a wall thereof at a level within the chamber equal to the desired bed level, and providing that if the rate of outflow of bed material exceeds a predetermined limit material is abstracted from the bed while if the rate of material outflow is less than a predetermined limit material is added to the fluidized bed.

The monitoring of the outflow of material from the chamber may be effected by measuring the weight, height, temperature or radiation of material collected at a detector location within a predetermined time limit.

Subtraction or extraction of material from the bed may be effected at either a high level within the bed or at a low level depending upon the fuel being used in the combustor and the type of impurities carried to the combustor by that fuel.

It is possible that material added to the bed may be material which has previously been subtracted therefrom, material being returned to the bed in this way having been screened to remove therefrom degraded bed material and/or other particles which it is not desired to return to the bed.

A further feature of the invention provides apparatus for use within a fluidized bed combustor system for controlling the bed level, the apparatus comprising means monitoring the outflow of bed material from the combustion chamber via an aperture formed therein at a height equal to that of a desired bed height, means for feeding material from/to the bed, and means controlling the feed means in response to electrical output signals from the monitoring means to cause the feed means to either add or subtract material from or to the bed.

The monitoring means preferably includes means for monitoring the presence and/or absence of bed material from a detector location and timer means operable to give an indication of at least two time periods.

The feed means preferably comprises two separate feeders one for putting material into the bed and the other for extracting material from the bed. Alternatively the feed means may comprise a single feeder operable either to take material from or to pass material to the bed.

The monitoring means may include means for weighing, measuring the height of, measuring the temperature of, or detecting the thermal radiation from material passing out of the combustor—to determine the presence of absence of such material.

Another area of concern when designing a fluidized bed combustor is that of ensuring there is no undue waste of expensive, high grade, fuel when preheating the bed to bring the bed to a temperature at which stable operation of the bed can continue with the operating fuel fed to it.

It will be appreciated that the combustion of fuel takes place in a fluidized bed combustor due to the temperature of the bed material and that when starting operation of the bed its temperature is low—generally the temperature of the surrounding air. It is therefore necessary to heat the bed material. This has conventionally been done by passing through the fluidizing gas distributor system heated air or other fluidizing gas.

One method of heating the gases passed to a fluidized bed that we have proposed is to provide that gases fed to the bed are passed through a pre-heater burning gas and/or oil. Passing heated air to the bed in this way can be expensive—particularly if the bed is of large volume requiring a significant heat input to raise it to its operating temperature.

We have found that it is possible to provide for only part of the bed be heated to its operating temperature at which time lower grade, operating fuel to be burnt in the fluidized bed combustor may be fed to that part of the bed and used to raise the temperature of the remainder of the bed to the stable operating temperature.

Accordingly another feature of this invention provides a fluidised bed shell boiler arrangement in which fluidization of the bed is effected by plurality of separate gas ducts extending into the bed from a plenum chamber, means being provided within the plenum chamber to prevent fluidizing gas passing to one or some of the gas ducts during initial start up of the arrangement. We preferably provide that the means preventing the passage of gas to one or more of the ducts comprises one or more paddles mounted on a rod or bar and and movable into and out of positions blocking the inlet ends of one or some of the gas ducts.

With advantage we provide for the pre-heating of a fluidized bed combustor by initially passing to the bed, to fluidize the bed, town or natural gas. In such an arrangement we preferably provide that the gas passed to the bed be ignited from above the bed by an ignitor feeding burning gas into the volume above the bed.

It is a further feature of the invention that we provide a fluidized bed shell boiler so designed that fuel, the fluidizing gas and water to be heated by the boiler are fed to the boiler at one end thereof and that the heated water or steam and flue gases issuing from the boiler are extracted from that said one end of the boiler.

The above noted and other features of the invention will become apparent from the following description of fluidized bed combustors embodying the invention, made with reference to the accompanying drawings, in which.

Figure 1:
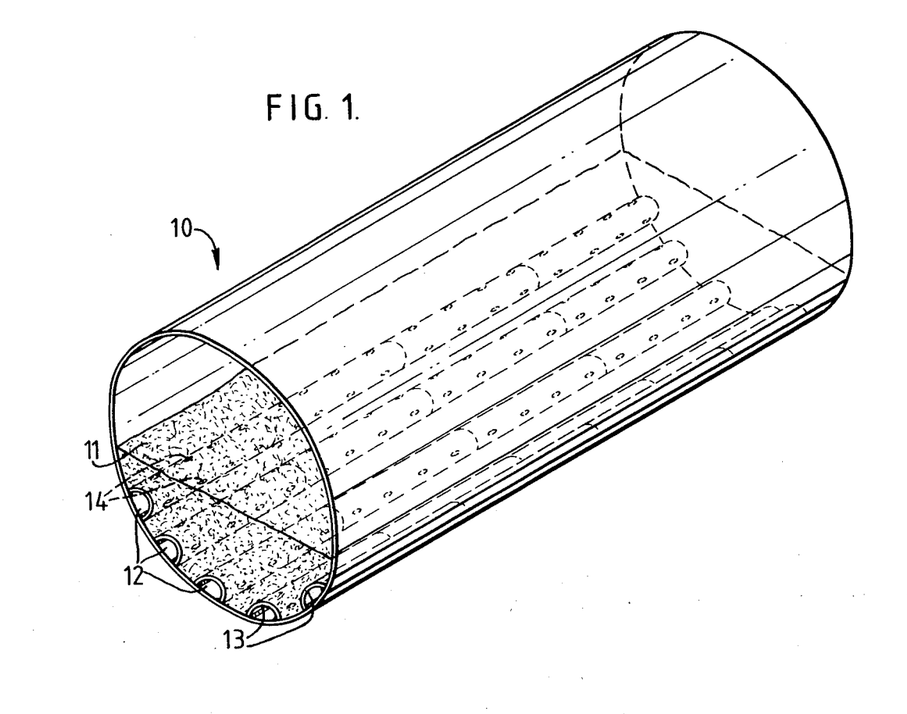
FIG. 1 is a diagrammatic, perspective, view of certain features of furnace tubes of which may be used in shell boilers embodying the invention and described with reference to FIGS. 2 to 6.

FIG. 1 shows a furnace tube 10 of a of a fluidized bed shell boiler to include a bed 11 of inert particulate material. The material of bed 11 is fluidized from ducts 12 formed by means of channels 13 formed integrally with and extending along the bottom of tube 10 as shown. The channels 13 are half-round or U-shaped in cross section and are of the same material as the tube 10. Preferably the channels 13 are 22 mm in thickness.

We prefer that each of the channels 13 be formed by a number of sections, the length of each section being approximately 500 mm.

The channels 13 have apertures formed in them as shown to extend generally horizontally away from channels center lines.

The channels 13 are formed to extend along the length of the furnace tube 10 and may extend through the end walls (not shown) of the tube 10. In use fluidizing gas is fed to channels 13 at a pressure enabling the gas to escape through the aperatures 14 and overcome the resistance of the ducts themselves, of the bed and any boiler or heat exchanger passages or auxiliary equipment (e.g. grit arresters) located downstream of the furnace tube.

To ensure that the gas velocity exiting from the aperatures 14 is substantially the same along the length of the channels 13 we provide that those channels taper in a direction away from the ends thereof to which fluidizing gas is fed. Thus if gas is introduced to that end of the tube 10 shown to the left in FIG. 1 the channels 13 will taper in a direction towards the right of the Figure.

Fluidizing gas may be introduced to both ends of the channels 12 in which case two separate tapering lengths of channels would be provided each tapering from its outermost end towards the center of the furnace tube 10.

It is envisaged that fluidizing gas could be supplied to the channel 13 via a plurality of ports piercing the wall of tube 10 on which the channels are mounted. If this is done there is, of course, no need to taper the tubes or channels.

We also envisage that the channels 13 could be of constant cross-section but have located within them tapering wedges, the thin ends of the wedges being adjacent the inlet ends of the channels and being shaped to provide uniform distribution of gas from the channels 13 into the bed 11. If wedges are used we propose that they be removable to enable modification to their angles and/or shapes to obtain optimum gas distribution into the bed, should this be required during the initial testing and setting up of the combustor.

It will further be appreciated that the sizes of ducts 12 (the cross-sectional areas of the channels 13) and the sizes of the apertures 14 may vary inversely in dependence upon the depth of the channels in bed 11. This would enable gas exiting from channels deeper in the bed—where the static pressure of the bed is greatest—to be a substantially the same velocity as gas exiting from (larger) channels located higher in the bed.

The channels are located low within the bed, lower than fuel would normally reach before being completely burnt (or burnt to an extent that it would be carried out of the bed with the fluidizing gas passing therethrough) and thus operate at a relatively low temperature at which the strength and abrasion resistance of their material is at their greatest.

Another advantage of the location of the gas ducts low in the bed is that for a given depth of a bed a greater depth of fluidization is obtained with a resultant greater volume for radiant heat transfer within the combustion chamber.

Thus the provision of the integral gas distributors of relatively heavy boiler plate as now proposed provides a robust, relatively inexpensive construction which operates at low temperatures and forms a secure part of the furnace tube containing a fluidized bed.

The above described gas distribution arrangement is shown to be used in the embodiments of the invention now described with reference to FIGS. 2 to 6, but it will be appreciated that these embodiments may alternately make use of sparge tube arrangements as described in U.K. Pat. No. 1540378.

Figure 2:
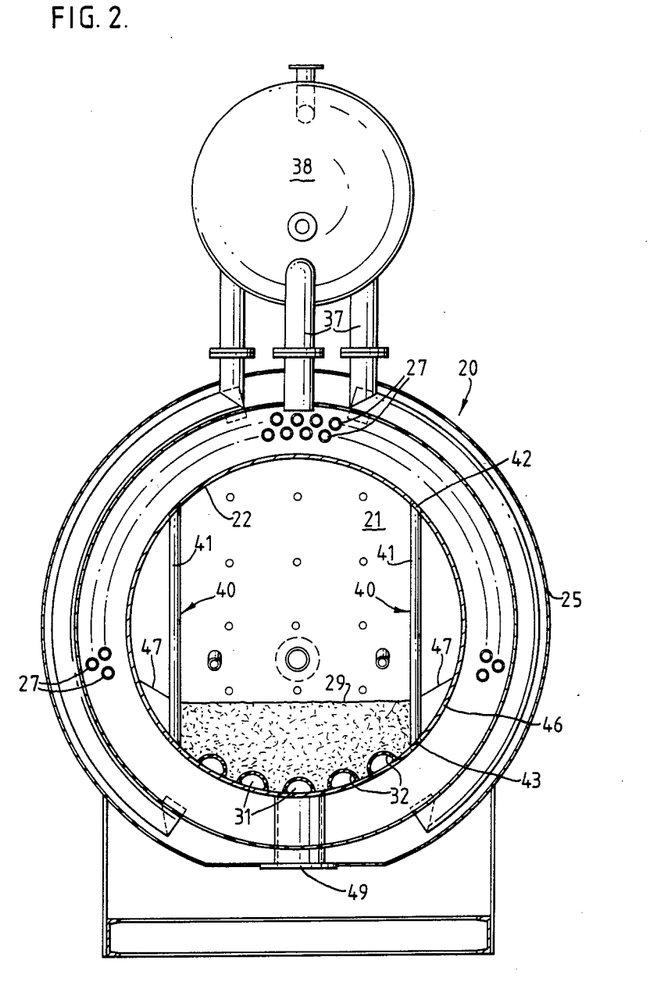
FIG. 2 is a longitudinal section from one end of a boiler embodying the present invention drawn on the lines II—II of FIG. 3.
Figure 3:
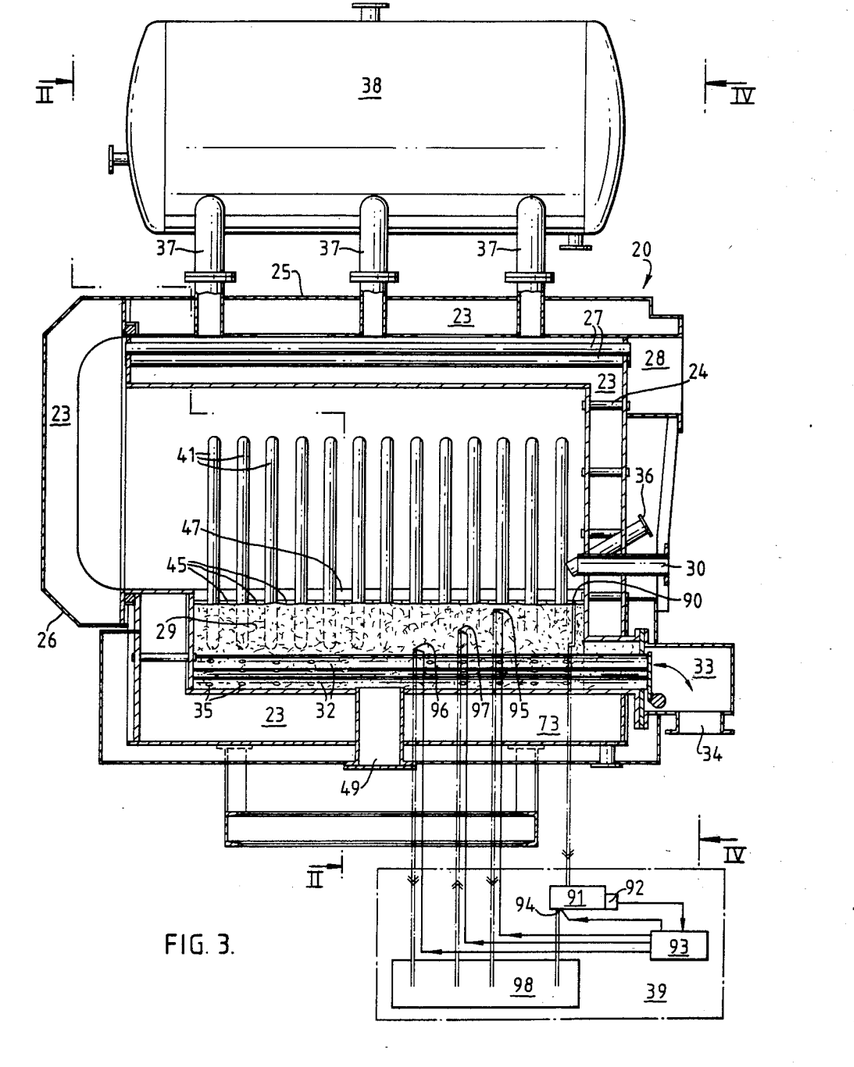
FIG. 3 is a sectional side elevation of the boiler of FIG. 2, drawn on the line III—III of FIG. 4.
Figure 4:
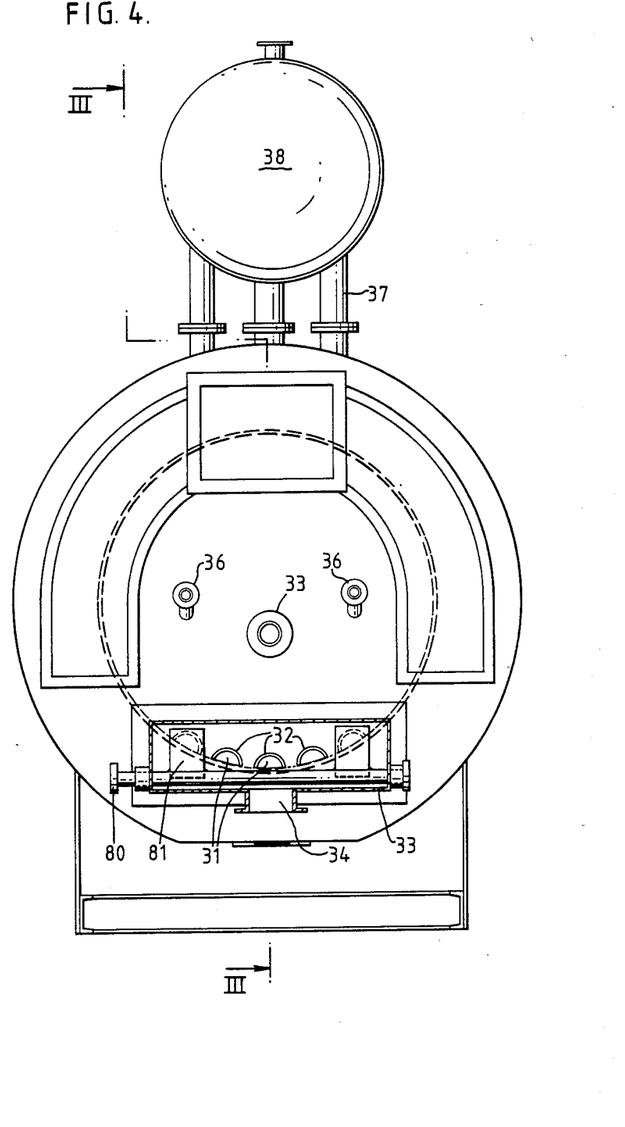
FIG. 4 is an end view, partially in section, of the boiler of FIG. 2 drawn on the lines IV—IV of FIG. 3.

FIGS. 2 to 4 illustrate the relevant parts of a shell boiler 20 embodying the invention. The boiler 20 includes a furnace tube 21 bounded by a wall 22 which forms the inner wall of a water jacket 23 of the boiler. Stays 24 support the furnace tube 21 within this water jacket space formed between the tube 21 and the outer casing 25 of the boiler. An end of the furnace 21 is bounded by a hollow door 26 arranged as shown to continue the water jacket 23.

Passing through the water jacket 23 are in array of smoke tubes 27 both above and to either side of the furnace tube 21 and through which the products of combustion pass from the furnace tube to a smoke box 28 and flue (not shown). The furnace tube 21 encloses a bed 29 of inert particulate material (for example sand) to which fuel (for example coal) is fed by a feeder 30.

The bed 29 is fluidized by an array of ducts 31 formed by channels 32 mounted on the bottom wall of the tube 21 (and extending along the length of that tube) in the manner described above with reference to FIG. 1. The ducts 31 are fed from a plenum chamber 33 with fluidizing gas passed to an inlet 34 of chamber 33. The fluidizing gas passes out of ducts 31 via apertures 35 in the channels 32.

In addition to the fuel feeder 30 there are also provided, as shown at the right most side of FIG. 3, gas start-up igniters 36.

Means 37 are provided enabling the coupling of the water jacket 23 to a steam drum 38 if desired. Means 39 may be provided enabling the level of inert particulate material in the bed to be controlled.

The fluidized bed 29 is bounded to either side by walls 40 which comprise a row of hollow water tubes 41 which are substantially straight and extend, substantially vertically within the furnace tube 21, piercing the wall 22 at the top and bottom as shown at 42 and 43 respectively. In use water will pass from water jacket 23 into the bottom of each tube 41 where it pierces wall 22 to 43, will then flow up tubes to the tops and then flow out of the tubes at 42, back into the water jacket 23.

The tubes 41 are spaced apart and the spaces between them, up to a level at or slightly above the normal maximum depth of the bed 29, is provided with a web of thermally conductive material 45. These webs may be provided with expansion slots to permit their expansion web being heated.

The volumes behind the wall 40 (that is to say the volume between the conductive web 45 and the lower side portions 46 of wall 22) are filled with a refractory material of high thermal conductivity as shown at 47.

Means 49 are provided allowing the bed material to be wholly removed from tube 21 when required.

Figure 5:
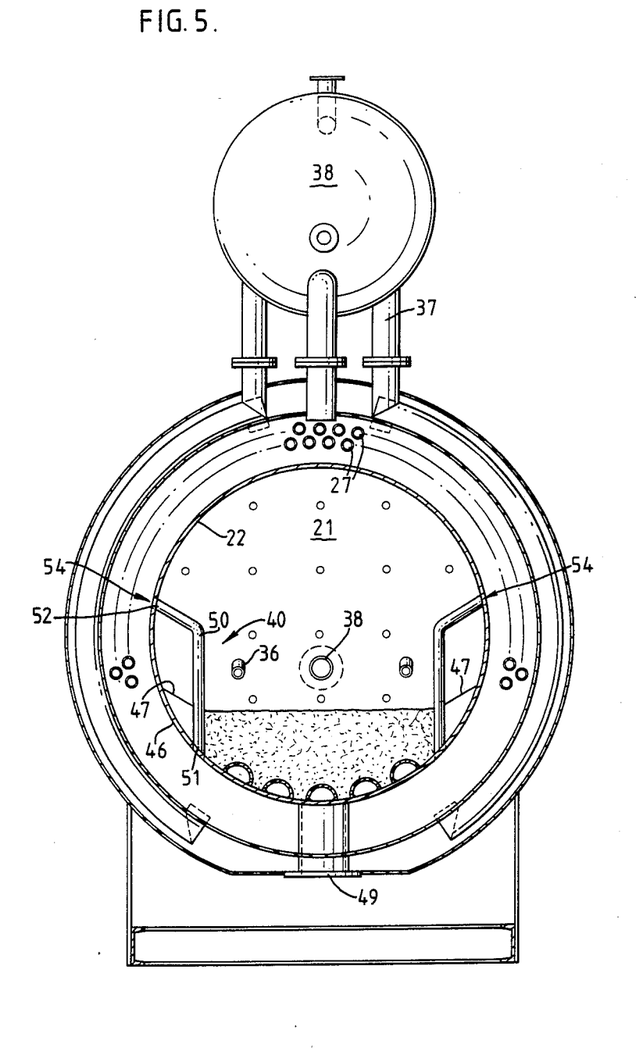
FIG. 5 is a view similar to that of FIG. 2 of a modified form of the boiler of FIG. 2.

The arrangement shown in FIG. 5 is in essence the same as that shown in FIG. 2, and like parts are given like reference numerals. In the arrangement of FIG. 5 the tubes 40 (FIG. 2) have been replaced by arcuate or curved tubes 50 which pass vertically upwardly over their lower extent from the lower portion of wall 22 and act as a boundary for the 29 within the furnace tube 21. Once the tubes 50 reach a height above that normally reached by the bed 29 they curve away to meet the side wall portions 54 of the wall 22.

The tubes 50 pierce wall 22 at their lower and upper ends at 51 and 52 respectively, to provide water inlets and outlets enabling water to flow from the water jacket 23, into the tube 50 and then back to the water jacket 23.

Figure 6:
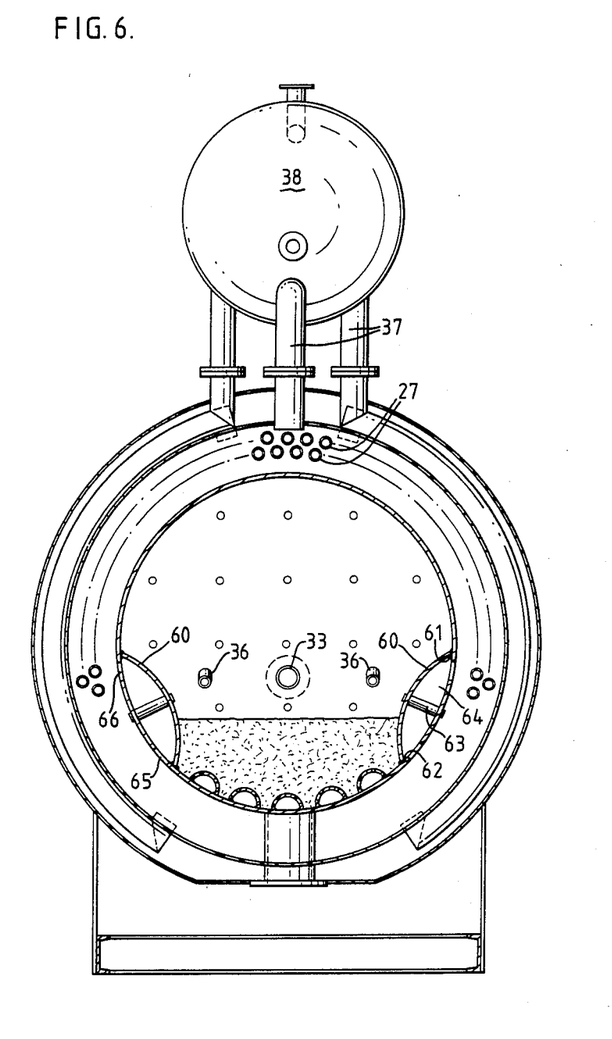
FIG. 6 is a view similar to FIG. 2 of another modified form of the boiler of Figure.

In the modified arrangement of FIG. 6 the fluidized bed 29 is bounded by substantially vertical walls formed by arcuate panels 60 welded to the wall 22 at their upper and lower margins at 61 and 62 respectively. The centers of the panels 60 are coupled by stays 63 to the wall 22 as shown. The volume 64 behind each panel 60 communicates with the water jacket 23 via apertures 65 sited at the bottom of the arcuate panels 60 allow water to pass from the water jacket 23 into the volume 64 while apertures 66 towards the top of arcuate panels allow heated water to flow out of the volume 64 and back into the water jacket 23.

It will be seen that the plenum chamber 33 through which fluidizing gas is fed to the ducts 31 houses a rod 80 carrying paddles 81. The paddles 81 are movable by rotation of rod 80 into positions in which they blank off the outer-most two ducts 31.

General operation of the boilers described with reference to FIGS. 2 to 6 inclusive is as follows.

To start up the boiler the paddles 81 are moved by rotation of the rod 80 into a position in which they blank off the outermost two ducts 31. A combustible gas, for example town or natural gas is fed to the plenum chamber 33 and passes via the ducts 31 and apertures 35 therein into the bed 29.

Combustible gas is also passed to the injectors 36 but this gas is lighted. The flame from injectors 36 ignites the gas passed to the bed 29 via the ducts 31 and in due time the central part of bed 29 attains a temperature at which combustion of normal operating fuel fed thereto can be sustained. Fuel feeder 30 is then started and fuel fed to the bed 29. The rod 80 is then rotated to move the paddles 81 away from the outermost pair of ducts 31 and the supply of combustible gas to chamber 33 is replaced with a supply of air which fluidizes the whole of the bed. The rest of the bed rapidly attains the normal operating temperature and when stable operation has been reached the air may be diluted with recycled flue gas or steam to achieve optimum control of the bed temperature as described in, for example, U.S. Pat. Nos. 2,030,689 and 1,548,898.

Heat from combustion begun in the bed 29 and continued in the volume furnace tube 21 above the bed transfers to water in water jacket 23 via the walls of tube 21 and of the smoke tubes 27 through which the hot products of combustion pass. In addition in the arrangement of FIGS. 2 to 5 heat passes to the water in the water tubes 41 or 50 and also via the web 45 and refractory material 47 directly to water in water jacket 23.

In the arrangement of FIG. 6 additional heat flow from the bed takes place through the arcuate panels 60 heating the water in the volumes 64.

Thus the heat of fuel burning in the boiler is transferred efficiently to the water to be heated. The transfer of heat from the burning fuel is by conduction from particulate material of the bed contacting the walls including the water tubes 41 or 50 or the arcuate panels 60 (and through the refractory material 47), radiation from the volume of the furnace tube 21 above bed 29, and by convection through the walls of the smoke tubes 27 leading to the smoke box 28.

The transfer of heat to the water in the tubes 41 shown in FIGS. 2, 3 and 4 is enhanced by the ability of hot combustible gas elutriating from bed 29 to pass around those tubes. At the same time the conductive web 45 between the tubes 41 prevents material from bed 29 passing, tubes 41 and into that volume of the furnace tube 21 which would be badly, if at all fluidized, in a conventional sparge tube or bubble-cap deck arrangement in a shell boiler.

The level of the bed within the fluidized bed combustor is controlled by the means 39.

The optimum level of the bed 29 within the furnace tube 21 is the design level.

We provide that the bed bounding wall (40 FIGS. 2-5, 60 FIG. 6) is pierced at that height, at 90, to provide an outlet through which bed material will pass if the bed level exceeds the design level.

Material from bed 29 passing out of outlet 90 is passed to a detector silo 91 in which the presence or absence of material is continuously monitored by a device 92 which generates an electrical signal fed to a controller 93. Controller 93 effects control of an outlet port 94 of the detector silo 91 further outlets 95 and 96 for bed material piercing the bed bounding wall and a bed material feeder (not shown) feeding material to an input port 97 by means of which material may be passed into bed 29. The outlet ports 94, 95 and 96 and the inlet port 97 all feed to, or from, a storage silo 98 as shown.

Detector 92 may be any suitable device for monitoring the presence of bed material in silo 91, for example a weighing device, a temperature sensing device, a height measuring device or a radiation sensing device.

Operation of the bed level control means 39 will be described with reference to the following table in which column 1 indicates the operational status of the means 39; the code AM indicates that the means 39 is feeding material to bed 29; code SM indicates means 39 is subtracting material from the bed; and code NA indicates that the means 39 is neither adding to, nor subtracting from, the material of the bed.

Column 2 indicates the signal output of device 92; code NO indicating that the detector is not detecting the presence of material in this detector silo 91 and code OF that the detector is detecting the presence of such material.

Column 3 indicates the time for which a timer within controller 93 (or device 92) has been monitoring the condition noted in column 2 and either zero (—) greater or less than a first predetermined time limit (T1), or greater or less than a second predetermined time limit (T2).

Column 4 indicates, using the same codes used in column 1, the action which controller 93 initiates (or allows to continue) in response to the conditions noted in columns 1, 2 and 3.

| OPERATIONAL TABLE | | | |
|---|---|---|---|
| 1 (Existing Condition) | 2 (Output 92) | 3 (Time) | 4 (Initiated Action) |
| NA | NO | $<T_1$ | NA |
| NA | NO | $\geq T_1$ | AM |
| AM | NO | — | AM |
| AM | OF | — | NA |
| NA | OF | $<T_2$ | NA |
| NA | OF | $\geq T_2$ | SM |
| SM | OF | — | SM |
| SM | NO | — | NA |

It is envisaged that operation of the system may be biased in one or more ways.

In certain conditions for example (with low levels of fluidization of the bed) there will not be a high level of elutriation of bed material, and bed level will therefore tend to rise. In these conditions the system may be biased normally to subtract material from the bed and the detector 93 designed to generate a signal once the overflow in the bed has been absent for a time greater than time $T_2$ which in turn activates controller 93 to stop subtracting material from bed 29.

When using a fuel with a high ash content the ashes and degraded bed material will rapidly be carried off with gases passing out of the bed and the bed level will tend to fall. In these circumstances the system would be biased to operate such that material is fed to the bed until an overflow condition occurs (e.g. for a time greater than time $T_1$).

When operating the boiler with a fuel tending to leave a high proportion of light residues within bed 29 these residues tend to rise to the top of the bed. In such circumstances abstraction of bed material would be via outlet 95. In alternative circumstances (when the fuel contains a high level of slate or stone) these residues will tend to fall to the bottom of the bed and abstraction of bed material may be via the outlet 96.

It is envisaged that material taken from bed 29 will be screened by in silo 98 to remove therefrom the inpurities (degraded bed material, slate, stone etc.) before the material is returned to bed 29 for reuse.

Although as described the overflow is monitored at only one location it will be appreciated that more than one location may be provided if it is envisaged that the bed may be operated at more than one height (for example when burning different fuels).

It will be seen that this method of bed level control has significant advantages over the known proposals.

The monitoring of the height of the bed is removed from the furnace tube and away from the hot; erosive and corrosive conditions within the boiler. Detector 92 is not subjected to the forces built up within the chamber which make reliable operation difficult and sometimes impossible at high or low bed levels.

As noted above the detector may be operated by the mechanical force of the falling or transported overflowing material, by weighing that material in a receptacle (the amount received per unit time), by measuring its elevated temperature or the radiation that it gives off.

An advantage of this proposal is the provision of a self-contained device operation of which avoids the need to dispose of a large quantity of an extremely hot bed material which, for the main part, may still be in a usable condition. This saving in bed material can prove significant in considering the overall operating costs of the system.

The removal of bed material from the detector outside the bed after its detection there, is stated with emphasis, as this is the essential mode of operation, restoring the detector to its receptive condition. Returning this material to the bed is a preferred form of removal.

Generally when operating the boilers described herein the provision of vertical bed bounding walls (40 or 60) as the result that any fuel which clinkers near side walls will tend to fall to the bottom of the bed rather than remain in position on the gently sloping surface of the bottom of the furnace tube. From this position they may be more readily abstracted from the bed material via the port 96.

It will further be appreciated that the design described above with reference to FIGS. 2 to 6 provides that all firing and servicing of the boiler e.g. the supply of fuel, of start up gas, of fluidizing air with or without recycled flue gas, and the abstraction of smoke from the boiler is effected from one end of the boiler.

The ability within the arrangements described to blank off at least some of the ducts passing fluidizing gas to bed 29, be they ducts as described with reference to FIG. 1 or normal sparge tubes extending through the bed, enables significant savings in the high cost startup fuels required to ensure that the boiler reaches its operating temperature at which stable operation may continue.

It is noted that the smoke tubes 27 form an arc about the top part of furnace tube 21 and above the bed 29, as this particular arrangements tend to prevent bed material being carried into the smoke tubes.

In addition to the various modifications which may be made to the disposition and/or formation of the gas distribution ducts already noted, it is possible to vary other design features which have been described herein. For example it is possible that the bed bounding walls described with reference to FIGS. 2 to 5, may be modified by removing the walls 45 and providing that the water tubes 41 and 50 carry lugs or fillets holding in place a cast body of refractory material 47. Again the cast body of refractory material 47 may be sloped (as shown in the figures) such that bed material thrown thereonto during operation of the boiler falls back into the bed. An advantage of this is as will be seen is the enhanced transfer of heat from the bed material to the water in the tubes.

Although the paddles 81 are described as being moved by rotation of rod 80 it will be appreciated that they may be moved into position by sliding them (vertically or horizontally) into and out of positions blocking gas ducts 40.

If desired the injectors 36 may be removed and the bed heated by passing pre-heated gas to the bed as described in U.K. Pat. No. 1540378.

We claim:

1. A shell boiler comprising a furnace tube which is generally circular in cross-section and is surrounded by a water jacket, a bed within said furnace tube of inert particulate material, means for feeding said bed with gas to fluidize said bed and support combustion of fuel fed thereto, walls provided within said furnace tube to bound the fluidized bed, at least those portions of said walls contacting the bed being disposed substantially vertically, such that the maximum width of the bed is less than the maximum width of the volume of the furnace tube above the fluidized bed therein, at least two of said walls bounding the fluidized bed include hollow water tubes piercing the wall of the furnace tube and communicating with the water jacket surrounding said furnace tube, said hollow water tubes being spaced apart and provided with conductive webs extending between those parts of the tubes adjacent the bed to prevent the passage of bed material therebetween.

2. A boiler as claimed in claim 1, in which at least two sides of said fluidized bed within the furnace tube are bounded by substantially vertical sections of convex shape provided within said furnace tube, these side walls being formed by segments of arcuate panels located within said furnace tube and wherein the volumes behind the arcuate panels communicate with the water jacket surrounding the furnace tube via apertures in said furnace tube wall adjacent and behind said panels.

3. A boiler according to claim 1, further including means for controlling the level of the bed therein, said means comprising a means monitoring the outflow of bed material from the furnace tube of the boiler via an aperture formed therein with a height equal to that of a desired bed height, means feeding material to or from the bed and means for controlling the feeding means, in response to outputs from the monitoring means, to cause the feeding means to either add or subtract material from and/or to the bed.

4. A boiler as claimed in claim 1, in which said hollow water tubes are substantially straight and extend substantially vertically within the furnace tube.

5. A boiler as claimed in claim 4, in which said water tubes extend to a height above that of said fluidized bed therein and then curve outwardly to meet the side wall portions of said furnace tube.

6. A boiler as claimed in claim 1, including ducts extending into said fluidized bed from a plenum chamber, for passing fluidizing gas for fluidization of the bed material, each said duct having apertures from which gas may pass into the bed material, and blocking means provided within said plenum chamber operable to selectively prevent gas passing to one or more of said ducts.

7. A boiler as claimed in claim 6, in which said blocking means comprises paddle means provided within said plenum chamber movable into and out of positions blocking the inlet ends of one or more of said ducts.

8. A boiler as claimed in claim 6, wherein each duct forming part of said distributor system is of reducing internal cross-section along the length thereof in a direction extending away from the end of the duct to which fluidizing gas is fed.

9. A boiler as claimed in claim 1, wherein the volume on that side of the water tubes spaced from said bed material is filled with a refractory material of good thermal conductivity, and said tubes having means holding the refractory material in position.

10. A boiler as claimed in claim 9, in which said hollow water tubes are substantially straight and extend substantially vertically within the furnace tube.

11. A boiler as claimed in claim 9, including ducts extending into the fluidized bed from a plenum chamber, for passing fluidizing gas for fluidization of the bed material, each duct having apertures from which gas may pass into the bed material, and paddles provided within said plenum chamber movable into and out of positions blocking the inlet ends of one or more of said ducts.

12. A boiler according to claim 11, further including control means for controlling the level of the bed therein, said control means comprising a means monitoring the outflow of bed material from the furnace tube of the boiler via an aperture formed therein with a height equal to that of a desired bed height, means feeding material to or from the bed and means for controlling the feeding means, in response to outputs from the monitoring means, to cause the feeding means to either add or subtract material from and/or to the bed.

13. A shell boiler as claimed in claim 1, including a distributor for passing fluidizing gas to the material of the bed therein, the distributor comprising one or more generally horizontal ducts formed between the bottom of said furnace tube of said boiler and one or more hollow channel sections mounted thereon, each channel section being formed of a number of gas exit ports.

14. A boiler as claimed in claim 13, wherein each duct forming part of said distributor system is of reducing internal cross-section along the length thereof in a direction extending away from the end of the duct to which fluidizing gas is fed.

15. A boiler as claimed in claim 13, wherein said channels are formed of half-round or U-shaped metal members, welded to the bottom of the bed container.

16. A boiler as claimed in claim 15, wherein said ducts are supplied with fluidizing gas from one or both ends thereof, or from gas ports penetrating the bottom plate of the bed container on which they are mounted.

* * * * *